R. BLACK.
HAY RACK.
APPLICATION FILED APR. 27, 1916.
1,225,004.
Patented May 8, 1917.
3 SHEETS—SHEET 1.
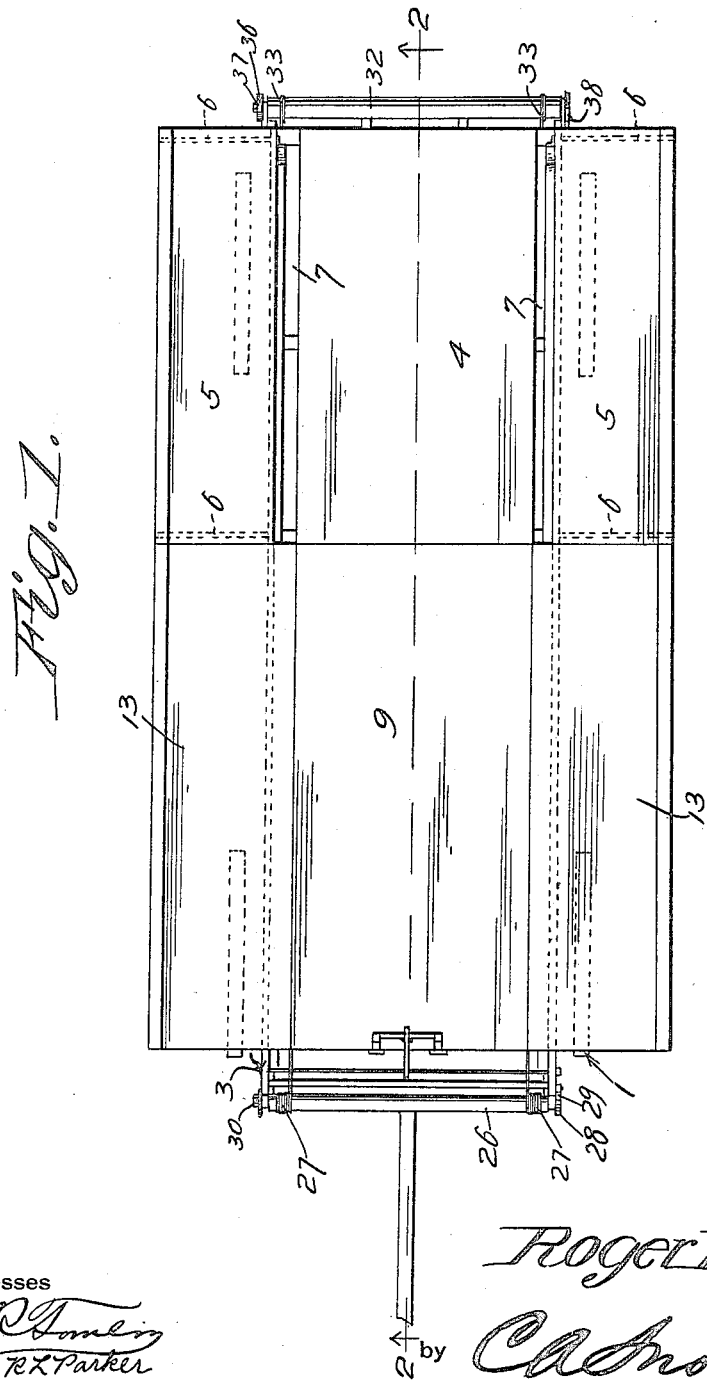

R. BLACK.
HAY RACK.
APPLICATION FILED APR. 27, 1916.
1,225,004.
Patented May 8, 1917.
3 SHEETS—SHEET 2.
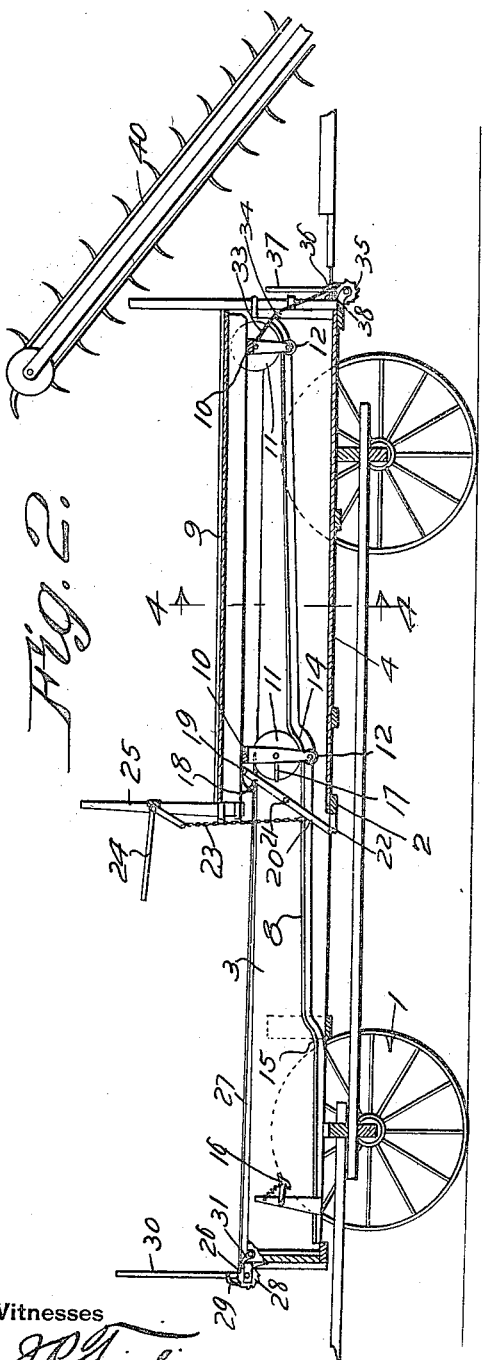
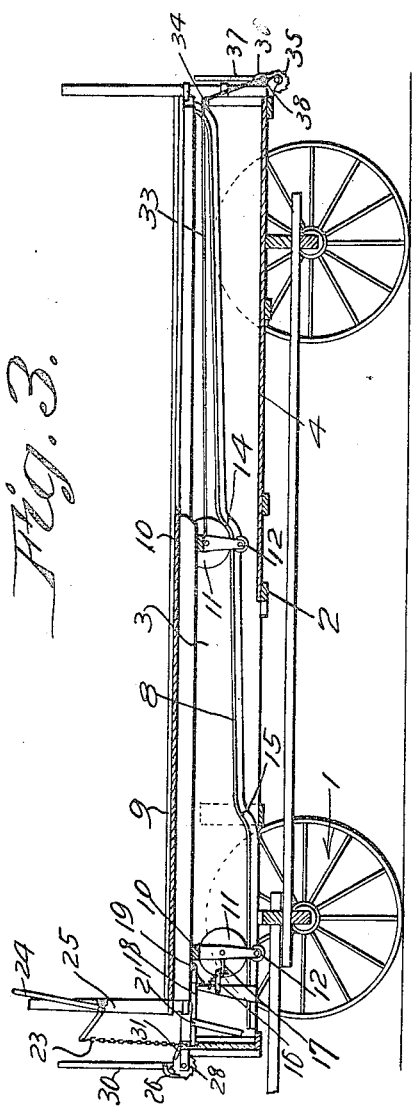
Witnesses
Roger Black,
Inventor
by
Attorneys

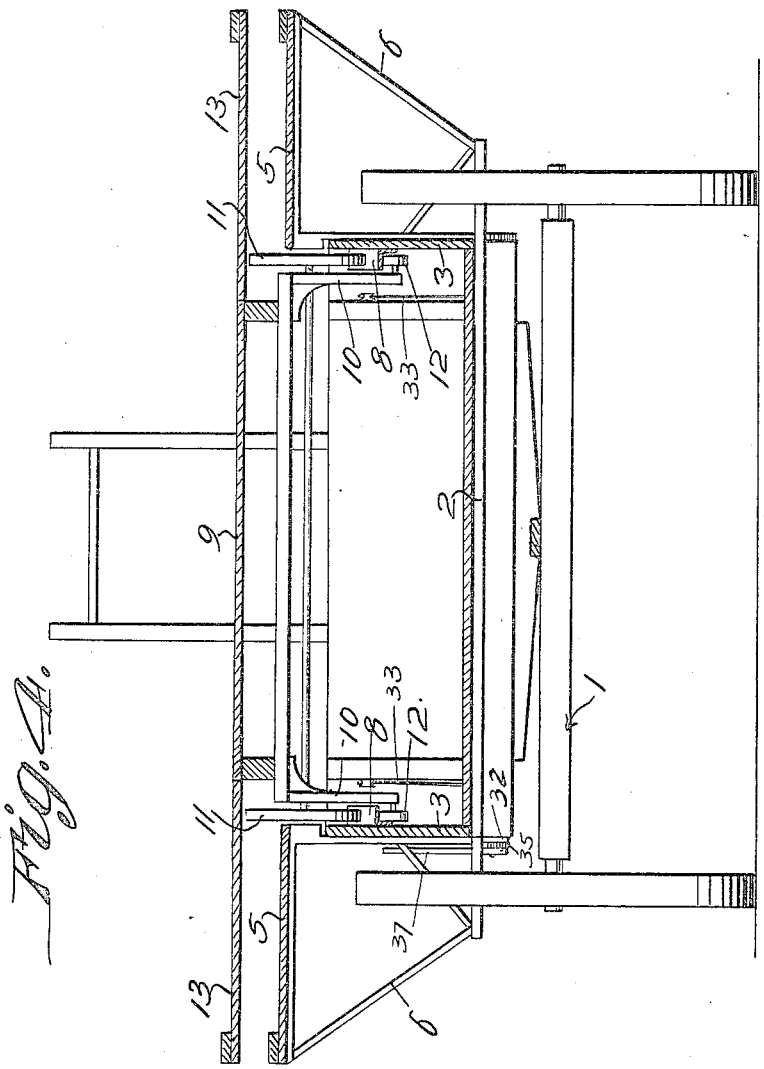

UNITED STATES PATENT OFFICE.

ROGER BLACK, OF PLEASANT HILL, OHIO.

HAY-RACK.

1,225,004.     Specification of Letters Patent.     Patented May 8, 1917.

Application filed April 27, 1916. Serial No. 93,950.

*To all whom it may concern:*

Be it known that I, ROGER BLACK, a citizen of the United States, residing at Pleasant Hill, in the county of Miami and State of Ohio, have invented a new and useful Hay-Rack, of which the following is a specification.

The present invention appertains to hay racks, and aims to provide a novel and improved hay rack for receiving hay or similar material from a loader.

It is the object of the invention to provide a hay rack having a carriage movable from one end thereof to the other end and adapted to receive the hay from the loader, whereby the carriage can be returned to its end of the rack to make room for additional hay delivered from the loader, whereby to eliminate the necessity of the manual transfer of the hay from the loader to the opposite end of the rack by means of pitch forks, as is usual, whereby the loading of the rack is facilitated and rendered less laborious.

A further object of the invention is the provision of a hay rack having the feature above noted and improved generally in its construction and details to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the improved hay rack.

Fig. 2 is a longitudinal section thereof taken on the line 2—2 of Fig. 1, showing the carriage moved to the rear end of the frame.

Fig. 3 is a similar section showing the carriage in normal position adjacent the forward end of the frame.

Fig. 4 is an enlarged cross section taken on the line 4—4 of Fig. 2.

The hay rack is carried by a suitable running gear 1, and embodies a frame 2 mounted upon said running gear. Said frame has the longitudinal side boards 3 set on edge and the frame is provided adjacent the rear end thereof with a lower horizontal platform 4 and upper horizontal side wings 5 supported by brackets 6 attached to the frame.

Rearwardly inclined rails 8, preferably formed from angle iron, are attached to the inner sides of the boards 3 and extend to the ends of the frame, and a carriage is movable along said rails from one end of the frame to the other. This carriage comprises a platform 9 and depending brackets 10 secured thereto and having wheels 11 running upon the rails 8 of the track carried by the frame. Rollers 12 are also carried by the lower ends of said brackets and engage under the rails 8 to prevent the jumping of the carriage off of the rails. The carriage also has side wings 13 forming extensions of the platform 9.

The wings 5 and 13 can be provided with upstanding side boards, to provide a box instead of a flat top, when this is preferred.

The front wheels 11 of the carriage are lower down than the rear wheels thereof, because of the rearward inclination of the rails 8, and the rails 8 have inclines or offsets 14 adjacent the forward ends of the wings 5, and similar inclines or offsets 15 between the inclines 14 and forward ends of the rails, the advantages of which will be pointed out hereinafter.

In order to hold the carriage in its lowermost position adjacent the forward end of the frame, a catch 16 is carried by the frame adjacent the forward end thereof, and is engageable with a keeper 17 with which the carriage is provided adjacent its forward end.

As a means for holding the carriage in its rearmost position adjacent the rear end of the frame, a downwardly projecting arm 18 is pivoted, as at 19, to the carriage adjacent its forward end, and a dog 20 is pivoted, as at 21, to the arm 18. The dog 20 is engageable with a member 22 of the frame, whereby when the arm 18 and dog 20 are straightened out, they are held in straight rearwardly inclined position, as seen in Fig. 2, to hold the carriage adjacent the rear end of the frame. To release the dog 20, a chain or other flexible element 23 is connected to the arm 18 and to a lever 24 fulcrumed to a standard 25 carried by the forward end of the carriage, whereby said lever 24 in being swung will raise the arm 18 to break the joint between it and the dog, so that they will no longer hold the carriage, thereby permitting the carriage to gravitate forwardly.

As a means for pulling the carriage forwardly, when necessary, a transverse roller 26 is journaled to the forward end of the frame, and cables 27 are wound thereon, and are attached to the forward brackets 10 of the carriage. A ratchet wheel 28 is secured to one end of the roller 28 for the engagement of a pawl 29 carried by an oscillatory hand lever 30, which can be moved back and forth to rotate the roller step-by-step, for winding up the cables thereon, the reverse rotation of the roller being prevented by a pawl 31 carried by the frame and engaging the ratchet wheel.

A similar device is used for pulling the carriage from the forward to the rear end of the frame. Thus, a transverse roller 32 is carried by the rear end of the frame, and has cables 33 wound thereon. Said cables pass over pulleys 34 and are attached to the rear brackets 10. A ratchet wheel 35 is secured to the roller 32 for the engagement of a pawl 36 carried by an oscillatory cam lever 37, and a pawl 38 carried by the frame engages the ratchet wheel to prevent the reverse rotation thereof, unless the pawl 38 is released.

In using the rack, after the frame is backed up or otherwise moved into place with its rear end adjacent the loader 40, a portion only of which is illustrated, the carriage is moved rearwardly, being held in this position by the arm 18 and dog 20, as seen in Fig. 2. When the carriage is in normal forward position, the rear wheels 11 thereof lie in front of the inclines 14, and the front wheels 11 are adjacent the forward lower terminals of the rails, whereby the platform 9 of the carriage is flush and in alinement with the wings 5 of the frame, as seen in Fig. 3. When the carriage is moved rearwardly, the rear wheels 11 in running up the inclines 14, raise the rear end of the platform 9 above the forward ends of the wings 5, so that the carriage platform can move over the frame platform, the front wheels of the carriage being raised by the inclines 15 to bring the forward end of the carriage to proper vertical position, as seen in Fig. 2. The carriage can be moved rearwardly conveniently by rotating the roller 32 to wind the cables 33 thereon. The carriage will therefore receive the hay or other material which is delivered from the loader, and when the carriage is completely filled with hay, it is moved forwardly to initial position, thereby carrying the hay therewith, and leaving the rear portion of the rack clear, to receive a further quantity of hay from the loader. The first batch of hay is thus shifted to the forward end of the rack, to make room for further hay, and without the necessity of pitching the hay manually to the forward end of the rack as is now done. The carriage is released by swinging the lever 24, as above indicated, and will gravitate to its forward position, but the roller 26 can be operated to wind up the cables 27 to forcibly pull the carriage forward when it will not gravitate of itself.

The bed of the rack can be changed for different materials, and can be of any suitable construction according to the material handled.

Having thus described the invention, what is claimed as new is:

A hay rack embodying a longitudinal frame, horizontal side wings carried thereby extending from one end of the frame to a point between the ends thereof, a pair of rails carried by the frame and extending from one end thereof to the other, said rails being inclined from end to end and having their upper ends located at the first mentioned end of the frame, a carriage having a platform movable over said wings in one direction and adapted to move flush with said wings when moved in the other direction, said carriage having brackets, wheels carried by said brackets running upon said rails, and rollers carried by the brackets working below the rails to hold the wheels thereon, said rails having offsets adjacent to those ends of the wings between the ends of the frame, the wheels at one end of the carriage being normally disposed adjacent to said offsets when the platform of the carriage is flush with said wings, and said wheels being adapted to move up said offsets for raising the corresponding end of the carriage when the carriage is moved toward the wings.

In testimony that I claim the foregoing as my own, I have hereto affixed my signature in the presence of two witnesses.

ROGER BLACK.

Witnesses:
C. F. PERKINS,
F. C. LONGNECKER.

Copies of this patent may be obtained for five cents each, by addressing the "Commissioner of Patents, Washington, D. C."